United States Patent
Lim et al.

(10) Patent No.: US 6,788,745 B1
(45) Date of Patent: Sep. 7, 2004

(54) CIRCUIT AND METHOD FOR ACTIVE TERMINATION OF A TRANSMISSION LINE

(75) Inventors: Drahoslav Lim, San Diego, CA (US); Arnold Muralt, Fair Haven, NJ (US)

(73) Assignee: Fujitsu Limited, kawasaki (JP)

( * ) Notice: Subject to any disclaimer, the term of this patent is extended or adjusted under 35 U.S.C. 154(b) by 743 days.

(21) Appl. No.: 09/715,293

(22) Filed: Nov. 17, 2000

Related U.S. Application Data

(60) Provisional application No. 60/166,057, filed on Nov. 17, 1999.

(51) Int. Cl.[7] .......................... H04L 25/49; H04M 7/04
(52) U.S. Cl. ........................ 375/297; 379/394; 379/398
(58) Field of Search ............................... 375/258, 222, 375/220, 377, 285; 379/402, 405, 345, 391, 414; 330/260, 293, 85, 165–167; 370/286, 290, 282

(56) References Cited

U.S. PATENT DOCUMENTS

| | | | | |
|---|---|---|---|---|
| 4,174,470 A | * | 11/1979 | Seidel | 379/405 |
| 4,181,824 A | * | 1/1980 | Seidel | 379/403 |
| 4,393,494 A | * | 7/1983 | Belforte et al. | 370/284 |
| 4,604,740 A | * | 8/1986 | Gandini et al. | 370/284 |
| 4,796,295 A | * | 1/1989 | Gay et al. | 379/392 |
| 4,961,219 A | * | 10/1990 | Patel | 379/398 |
| 5,121,080 A | * | 6/1992 | Scott et al. | 330/260 |
| 5,510,751 A | * | 4/1996 | Nauta | 330/84 |
| 5,528,630 A | * | 6/1996 | Ashley et al. | 375/258 |
| 5,602,912 A | * | 2/1997 | Hershbarger | 379/402 |
| 5,760,601 A | * | 6/1998 | Frankeny | 326/30 |
| 5,856,758 A | * | 1/1999 | Joffe et al. | 330/85 |
| 5,936,393 A | * | 8/1999 | Nauta | 323/316 |
| 5,973,490 A | * | 10/1999 | Nauta | 323/316 |
| 5,999,619 A | * | 12/1999 | Bingel | 379/394 |
| 6,111,949 A | * | 8/2000 | Sheets et al. | 379/414 |

* cited by examiner

Primary Examiner—Stephen Chin
Assistant Examiner—Jason M. Perilla
(74) Attorney, Agent, or Firm—Greer, Burns & Crain, Ltd.

(57) ABSTRACT

An improved line driver and method for increasing the power efficiency, signal accuracy, and stability of a transmit signal on a transmission line are disclosed. The improved line driver uses a negative feedback control loop, thereby enhancing operational stability and suppressing both amplifier imperfections and discrete component manufacturing variances. Furthermore, when the improved line driver output stage is integrated with a hybrid, the composite circuit provides a power efficient full duplex solution for line driver applications. In a preferred embodiment, the improved line driver may comprise an active line termination control loop with current sense feedback, a first amplifier, and a second amplifier. The present invention can also be viewed as providing a method for increasing the stability, power efficiency, and accuracy of a line driver in a duplex transmission system. In its broadest terms, the method can be described as: applying a transmit signal to an input stage of a line driver; amplifying the transmit signal; using an active termination feedback control loop to generate a feedback signal; amplifying the feedback signal; combining the feedback signal with a duplex signal on a transmission line to generate a scaled transmit signal; and combining the scaled transmit signal with the duplex signal to recover a remotely generated receive signal from the transmission line.

26 Claims, 6 Drawing Sheets

CIRCUIT AND METHOD FOR ACTIVE TERMINATION OF A TRANSMISSION LINE

CROSS-REFERENCE TO RELATED APPLICATION

The present application claims the benefit of co-pending U.S. provisional patent application, issued Ser. No. 60/166,057, and filed Nov. 17, 1999, which is hereby incorporated by reference in its entirety.

FIELD OF THE INVENTION

The present invention generally relates to high-speed data communications on a transmission line. More specifically, the invention relates to an improved line driver with active line termination, which solves problems associated with power efficiency, recovering receive signals from a duplex signal transmission, and manufacturing variances of circuit components.

BACKGROUND OF THE INVENTION

With the advancement of technology, and the need for instantaneous information, the ability to transfer digital information from one location to another, such as from a central office (CO) to a customer premise (CP) has become more and more important.

In a digital subscriber line (DSL) communication system, and more particularly an xDSL system where "x" indicates a plurality of various standards used in the data transfer, data is transmitted from a CO to a CP via a transmission line, such as a two-wire twisted pair, and is transmitted from the CP to the CO as well, either simultaneously or in different communication sessions. The same transmission line might be utilized for data transfer by both sites or the transmission to and from the CO might occur on two separate lines. In this regard reference is now directed to FIG. 1, which illustrates a prior art xDSL communication system 1. Specifically, FIG. 1 illustrates communication between a central office (CO) 10 and a customer premise (CP) 20 by way of twisted-pair telephone line 30. While the CP 20 may be a single dwelling residence, a small business, or other entity, it is generally characterized as having plain old telephone system (POTS) equipment, such as a telephone 22, a public switched telephone network (PSTN) modem 25, a facsimile machine 26, etc. The CP 20 may also include an xDSL communication device, such as an xDSL modem 23 that may permit a computer 24 to communicate with one or more remote networks via the CO 10. When a xDSL service is provided, a POTS filter 21 might be interposed between the POTS equipment 22 and the twisted-pair telephone line 30. As is known, the POTS filter 21 includes a low-pass filter having a cut-off frequency of approximately 4 kilohertz to 10 kilohertz, in order to filter high frequency transmissions from the xDSL communication device 23 and to protect the POTS equipment from the higher frequency xDSL equipment (e.g., the phone 22 and the facsimile machine 26 ).

At the CO 10, additional circuitry is typically provided. Generally, a line card (i.e., Line Card A) 18 containing line interface circuitry is provided to communicatively couple various xDSL service related signals along with PSTN voice signals to the twisted-pair telephone line 30. In fact, multiple line cards 14, 18 may be provided to serve a plurality of copper telephone subscriber loops. In the same way, additional interface circuit cards are typically provided at the CO 10 to handle different types of services. For example, an integrated services digital network (ISDN) interface card 16, a digital loop carrier line card 17, and other circuit cards, for supporting similar and other communication services, may be provided.

A digital switch 12 is also provided at the CO 10 and is configured to communicate with each of the various line cards 14, 16, 17, and 18. At a PSTN interface side of the CO (i.e., the side opposite the various line cards 14, 16, 17, and 18 supporting the telephone subscriber loops), a plurality of trunk cards 11, 13, and 15 are typically provided. For example, an analog trunk card 11, a digital trunk card 13, and an optical trunk card 15 are illustrated in FIG. 1. Typically, these circuit cards have outgoing lines that support numerous multiplexed xDSL service signal transmissions.

Having introduced a conventional xDSL communication system 1 as illustrated and described in relation to FIG. 1, reference is now directed to FIG. 2, which is a prior art functional block diagram further illustrating the various functional elements in a xDSL communications link 40 between a line card 18 located within a CO 10 and a xDSL modem 23 located at a CP 20 as introduced in FIG. 1. In this regard, the xDSL communications link 40 of FIG. 2 illustrates data transmission from a CO 10 to a CP 20 via a transmission line 30, such as, a twisted-pair telephone transmission line as may be provided by a POTS service provider to complete a designated link between a CO 10 and a CP 20. In addition, FIG. 2 further illustrates data transmission from the CP 20 to the CO 10 via the same twisted-pair telephone transmission line 30. With regard to the present illustration, transmission of data may be directed from the CP 20 to the CO 10, from the CO 10 to the CP 20 or in both directions simultaneously. Furthermore, data transmissions can flow on the same twisted-pair telephone transmission line 30 in both directions, or alternatively on separate transmission lines (one shown for simplicity of illustration). Each of the separate transmission lines may be designated to carry data transfers in a particular direction either to or from the CP 20.

The CO 10 may include a printed circuit line card 18 (see FIG. 1) that includes a CO-digital signal processor (DSP) 43, which receives digital information from one or more data sources (not shown) and sends the digital information to a CO-analog front end (AFE) 45. The CO-AFE 45 interposed between the twisted-pair telephone transmission line 30 and the CO-DSP 43 may convert digital data, from the CO-DSP 43, into a continuous time analog signal for transmission to the CP 20 via the one or more twisted-pair telephone transmission lines 30.

One or more analog signal representations of digital data streams supplied by one or more data sources (not shown) may be converted in the CO-AFE 45 and further amplified and processed via a CO-line driver 47 before transmission by a CO-hybrid 49, in accordance with the amount of power required to drive an amplified analog signal through the twisted-pair telephone transmission line 30 to the CP 20.

As is also illustrated in FIG. 2, the xDSL modem 23 located at the CP 20 may comprise a CP-hybrid 48. The CP-hybrid 48 may be used to de-couple a received signal from the transmitted signal in accordance with the data modulation scheme implemented by the particular xDSL data transmission standard in use. A CP-AFE 44, also located at the CP 20, may be configured to receive the de-coupled received signal from the CP-hybrid 48. The CP-AFE 44 may be configured to convert the received analog signal into a digital signal, which may then be transmitted to a CP-DSP 42 located at the CP 20. Finally, the digital information may be further transmitted to one or more specified data sources such as the computer 24 (see FIG. 1).

In the opposite data transmission direction, one or more digital data streams supplied by one or more devices in communication with the CP-DSP 42 at the CP 20 may be converted by the CP-AFE 44 and further amplified via CP-line driver 46. As will be appreciated by those skilled in the art, the CP-line driver 46 may amplify and forward the transmit signal with the power required to drive an amplified analog signal through the twisted-pair telephone transmission line 30 to the CO 10. It is significant to note that the CP-hybrid 48 is used to regenerate the transmit signal so it may be subtracted from the receive signal when the DSL communication system 1 is receiving at the CP 20. As a result, the CP-hybrid 48 does not affect the transmitted signal in any way. The CO-AFE 45 may receive the data from the CO-hybrid 49, located at the CO 10, which may de-couple the signal received from the CP 20 from the signal transmitted by the CO 10. The CO-AFE 45 may then convert the received analog signal into one or more digital signals, which may then be forwarded to the CO-DSP 43 located at the CO 10. Finally, the digital information may be further distributed to one or more specified data sources (not shown) by the CO-DSP 43.

Having briefly described a xDSL communications link 40 between the line card 18 located within the CO 10 and the xDSL modem 23 located at the CP 20 as illustrated in FIG. 2, reference is now directed to FIG. 3. In this regard, FIG. 3 is a prior art circuit schematic for a conventional hybrid 49.

As illustrated in FIG. 3, a transmit signal, TX, may be provided from the CO-Line Driver 47 (FIG. 2) and applied across a back-matching resistor 57, herein labeled, "$R_b$." As is further illustrated in FIG. 3, impedance and voltage scaling may be performed by coupling the transmit signal, TX', to a two-wire transmission line, herein labeled, "TIP" and "RING" via a transformer 59.

As is also illustrated in FIG. 3, the transmit signal, TX, may be applied to a scaled voltage divider consisting of a first filter 53, labeled, "$Z_b$" and a second filter 55, labeled, "$Z_m$." The first filter 53 may be configured such that it emulates a scaled version of the back-matching resistor 57. For example, if the back-matching resistor is implemented with a resistor having a resistance of X Ohms, the first filter 53, $Z_b$, may be implemented such that its equivalent impedance is nX Ohms. Similarly, the second filter 55, $Z_m$, may be configured such that it emulates the sum of the line and load impedances, multiplied by the same scale factor, n. In a manner well known in the art, the transmit signal, TX', may be echoed across the second filter 55 and may be subtracted from a duplex signal, $V_{DUPLEX}$, comprising the combined receive and transmit signals, RX' and TX', respectively, appearing at the primary of the transformer 59 by a hybrid amplifier 61. As further illustrated in FIG. 3, the output of the hybrid amplifier 61, should comprise the received signal, RX", from a remotely located transmitter after the transmit signal, TX', has been subtracted.

In systems designated for data transmission over metallic transmission lines 30, the line driver amplifier 47 is the power amplifier which delivers the necessary energy to transmit a signal through the transmission line 30 through the back-matching resistor 57. The back-matching resistor 57 serves two purposes. First, the back-matching resistor 57 serves to match the impedance at the end of the transmission line 30. In order to provide a sufficient return loss, a resistor approximately equal to the transmission line's 30 characteristic impedance must terminate the line. Second, the back-matching resistor 57 permits the hybrid 49 to simultaneously receive signals generated from a remote transmitter coupled to the transmission line 30 at the same time the line driver 47 is transmitting. The line driver 47 cannot terminate the transmission line 30 alone because the line driver 47 presents a low load impedance to the remotely transmitted signal, RX. As a result, using a line driver 47 alone would be the equivalent of shunting the remote signal to ground, thus making the receive signal, RX, unrecoverable. The remotely transmitted signal, RX, is recovered by subtracting from the voltage on the transmission line 30 (i.e., the duplex signal) the voltage introduced on the transmission line 30 by the local transmitter, TX'. As shown, the hybrid amplifier 61 performs the task of separating and recovering the remotely transmitted signal (i.e., the received signal) from the transmission line 30.

For simplicity of illustration and description the prior art hybrid circuit of FIG. 3 is depicted in a single-ended configuration. Those skilled in the art will appreciate that in practice a differential and balanced version of the hybrid 49 may be implemented. The hybrid 49 functions properly if the line driver 47 has a very low output impedance. From a data transmission viewpoint, the output of the line driver 47 is an amplified version of the transmit signal. This amplified version of the transmit signal, TX, is applied across a voltage divider comprising the back-matching resistor 57 and the primary winding of the transformer 59. As a result, a voltage corresponding to the amplified transmit signal is present on the primary of the transformer 59.

From a data receive viewpoint, a receive signal, RX, originating at a CP 20 may arrive at the secondary winding of the transformer 59. As is known, a corresponding receive signal voltage, RX', is created via inductance on the primary winding of the transformer 59 and results in a current flowing into the back-matching resistor 57. Since the line driver 47 has a low output impedance, no component of the receive signal, RX', is present at the output of the line driver 47, which leaves only the amplified transmit signal, TX, at the output of the line driver 47. Since the xDSL communication system 1 operates in a substantially linear fashion, superposition applies and the voltage across the primary winding of the transformer 59, $V_{DUPLEX}$ consists of both the receive, RX', and the transmit signals, TX'.

If the first and second filters 53, 55 replicate the voltage divider formed by the back-matching resistor 57 and the primary winding of the transformer 59, then the voltage at the junction between the filter 53, 55 is equivalent to the voltage that would be applied across the transformer primary in the absence of a far end generated receive signal, TX'. As a result, the receive signal, RX, can be recovered by simply taking the difference between the voltage at the primary winding of the transformer 59 and the voltage at the junction between the first and second filters 53, 55. Hence, it is possible to simultaneously transmit and receive.

The prior art hybrid 49 circuit of FIG. 3 has the additional characteristic that components introduced by the line driver 47 are removed by the hybrid 49. In particular, transmit signal components due to imperfections in the line driver 47, such as noise and distortion, are removed by the hybrid and do not get forwarded to the CO-AFE 45 (FIG. 2) with the remotely generated receive signal. This functional aspect of the hybrid 49 is important because typically a high power amplifier, such as the line driver 47 amplifier, which provides the transmit signal will not be characterized by negligible noise and distortion at the required xDSL data transmission power levels.

The prior art hybrid 49 circuit of FIG. 3 suffers from the disadvantage that it is relatively inefficient. The voltage swing and power ultimately delivered to the primary winding of the transformer 59 and hence the secondary winding and the transmission line 30, is lower than the voltage swing and power sourced by the line driver 47. Assuming that the first and second filters 53, 55 have a sufficiently large and relatively matched impedance so that the power consumed within the filters 53, 55 is relatively negligible, a portion of the power delivered by the line driver 47 is dissipated in the back-matching resistor 57 with the remaining portion available at the primary winding of the transformer 59. That portion of the transmit signal dissipated in the back-matching resistor 57 can be reduced by reducing the magnitude of the resistance. However, the back-matching resistor 57 cannot be made arbitrarily small because the transmission line 30 would not be properly terminated at the primary winding of the transformer 59. Since the line driver 47 has a very small output impedance there would be no way of recovering the remotely generated receive signal, RX.

One way to avoid the power inefficiency inherent in the hybrid 49 presented in FIG. 3 is to construct a feedback circuit around the line driver 47 amplifier. Such a feedback circuit is presented in the circuit of FIG. 4. The circuit schematic presented in FIG. 4 and generally identified with reference numeral 60 is an example of a combination of a line driver 47 in cooperation with a positive feedback network and the transformer 59 of FIG. 3.

As illustrated in FIG. 4, a line driver amplifier with active termination 65 may be coupled with the transformer 59 of FIG. 3 to provide a transmit signal, TX', at the primary winding of the transformer 59. This configuration may further provide an inductively coupled transmit signal, TX", on a transmission line 30 that is electrically coupled to the secondary of the transformer 59. In this way, the line driver with active termination 65 appears as a voltage source at its output terminal with a low output impedance in series with a finite impedance. The apparent impedance may be adjusted such that the impedance matches the resistance of the back-matching resistor 57 of FIG. 3. The procedure of using feedback with an amplifier to generate an apparent impedance is generally known as active termination. The circuit schematic presented in FIG. 4 illustrates a relatively simple single-ended version of a line driver amplifier 47 with a positive feedback resistive network. For simplicity of illustration and description a single-ended version of the line driver with active termination 65 is presented. This presentation is by way of example only. Those skilled in the art will appreciate that a differential circuit implementation is typically selected to provide a line driver with active termination 65.

As illustrated in the exemplary circuit architecture of FIG. 4, the feedback network may comprise a plurality of individual components, typically resistors, generally configured as follows. A first resistor 71, herein labeled, "$R_1$," maybe interposed between an input or transmit signal terminal and the positive input terminal of the line driver power amplifier 47. A second resistor 73, labeled, "$R_2$," may be placed between the positive input terminal of the line driver power amplifier 47 and an output terminal of the line driver with active termination 65. A third resistor 75, labeled, "$R_G$," may be applied between signal ground and a negative input terminal of the line driver power amplifier 47. A fourth resistor 79, herein labeled, "$R'_B$," may be interposed between the output of the line driver power amplifier 47 and the output terminal of the line driver with active termination 65. A fifth resistor 77, labeled, "RF," may be placed between the negative input terminal of the line driver power amplifier 47 and the output terminal of the line driver amplifier 47 as shown.

It can be further shown that as viewed from the primary winding of the transformer 59, the resistive network surrounding the line driver power amplifier 47 may cause the voltage across the primary winding to vary as a function of the current, $I_L$, flowing through the primary winding, so that the primary winding appears to be driven by a voltage source through a finite impedance. With a suitable choice of resistance values for the various resistors 71, 73, 75, and 77, the apparent finite impedance can be shown to be the resistance value of the fourth resistor 79, (i.e., $R'_B$) multiplied by a factor given by the resistance values of the other resistors 71, 73, 75, and 77. Similarly, the equivalent line driver transmit gain of the line driver with active termination 65 (assuming an unloaded condition) may be determined in accordance with equation 1 using the resistance values for the various resistors 71, 73, 75, and 77.

More specifically, the equivalent line driver gain may be determined as follows:

$$A_0 = \frac{(A-K)}{(1-K)}. \quad \text{Eq. 1}$$

where, $$A = \frac{(R_G + R_F)}{R_G}$$

and $$K = \frac{A \times R_1}{(R_1 + R_2)}.$$

Similarly, the apparent back-matching resistance may be determined from the following function:

$$R_{OUT} = \frac{R'_B}{(1-K)}. \quad \text{Eq. 2}$$

Since the apparent back-matching resistance is not implemented as a physical resistor, but rather by controlling the output voltage as a function of the output current, little power is dissipated and little signal swing is lost. In the limit, if the fourth resistor 79, $R'_B$, is implemented with a very low resistance value and the other resistors 71, 73, 75, and 77 are implemented to give the desired apparent resistance, virtually all the power from the line driver power amplifier 47 may be delivered to the primary winding of the transformer 59. In this case, the remotely generated receive signal, RX, sees the appropriate back-matching resistance (i.e., impedance) and the receive signal, RX', can be recovered from the primary winding of the transformer 59.

The line driver with active termination 65 illustrated in FIG. 4 has several drawbacks. First, the feedback network in cooperation with the line driver power amplifier 47 uses positive feedback. This can be determined by examining the expressions for determining the equivalent line driver gain, $A_0$, and the apparent back-matching resistance, $R_{OUT}$. Observe that as the various resistance values are changed so that K approaches and then exceeds 1, the behavior of the circuit will qualitatively change as the signs (not only the magnitude) of the equivalent line driver gain, $A_0$, and the apparent back-matching resistance, $R_{OUT}$, change. These breaks or critical points in the functions defining both variables are characteristic of positive feedback systems. Positive feedback, in addition to introducing the qualitative changes noted above, also tends to emphasize component imperfections, system noise, and signal distortion.

Furthermore, a hybrid circuit cannot be connected to the line driver with active termination 65 illustrated in FIG. 4, because there is no node at which the voltage is due solely to the transmit signal other than the unamplified transmit signal input. The amplified transmit signal can be used to power the divider formed by the first and second filters 53, 55 (FIG. 3), or equivalent filters for that matter, which would lead to a recovery of the remotely generated receive signal at the primary winding of the transformer 59 (FIG. 3). However, in contrast to the conventional hybrid of FIG. 2, imperfections in the line driver amplifier 47 (FIG. 3) in the form of noise and distortion would be introduced only onto the primary winding of the transformer 59 (FIG. 3) and not onto the divider formed by the filters 53, 55 (FIG. 3). As a result, noise and distortion introduced by the line driver amplifier 47 would not be canceled out by the hybrid amplifier 61 (FIG. 3).

Finally, if it were desired to change or adjust the apparent back-matching impedance, $R_{OUT}$, in order to compensate for variance in the manufacture of $R'_B$ while attempting to maintain the equivalent line driver gain, $A_0$, the various resistors 71, 73, 75, and 77 must be adjusted in a complicated way because the gain and back-matching impedance are not independent of one another.

Accordingly, there is a need for a line driver with improved power efficiency that can be used in cooperation with a hybrid to remove line driver generated signal imperfections and to recover a remotely generated receive signal from a duplex signal transmission on a transmission line.

SUMMARY OF THE INVENTION

In light of the foregoing, the invention is a circuit and a method for constructing a line driver having increased power efficiency capable of driving a data transmission line with a transmitted signal having no line driver amplifier generated signal imperfections and capable of cooperation with a hybrid to recover a remotely generated receive signal from a duplex signal transmission. The improved line driver architecture of the present invention uses a negative feedback control loop, thereby enhancing operational stability and suppressing both amplifier introduced imperfections and discrete component manufacturing variances. Furthermore, the improved line driver of the present invention provides a power efficient full duplex solution for line driver applications.

In a preferred embodiment, an improved line driver may comprise an active line termination control loop with a current sense feedback, a first amplifier, and a second amplifier. By integrating the improved line driver with a hybrid the composite circuit provides a scaled version of the transmit signal which is free from remotely generated or receive signal effects, as well as, imperfections due to noise and distortion. In addition, the composite circuit provides a power efficient solution through the use of a finite and independently adjustable output impedance that may be used to avoid some of the loss in signal power that is typically dissipated within the line termination (i.e., the back-matching) resistance.

The present invention can also be viewed as providing a method for increasing the stability, power efficiency, and accuracy of a line driver. In its broadest terms, the method can be practiced by performing the following steps: applying a transmit signal to an input of a line driver; amplifying the transmit signal; applying the amplified transmit signal to a transmission line load to generate a load current; sensing the load current; and applying the sensed load current in a negative feedback control loop to generate a feedback signal responsive to the load current such that an output impedance that emulates a back-matching resistor is generated.

The present invention can be further viewed as providing a method for recovering a remotely generated signal from a transmission line in a duplex communication system. In its broadest terms the method can be practiced by performing the following steps: applying a transmit signal to an input stage of a line driver; amplifying the transmit signal; using an active termination feedback control loop to generate a feedback signal; amplifying the feedback signal; combining the feedback signal with a duplex signal on a transmission line to generate a scaled transmit signal; and combining the scaled transmit signal with the duplex signal to recover a remotely generated receive signal from the transmission line.

Other features and advantages of the present invention will become apparent to one skilled in the art upon examination of the following drawings and detailed description. It is intended that all such additional features and advantages be included herein within the scope of the present invention, as defined by the claims.

BRIEF DESCRIPTION OF THE DRAWINGS

The present invention will be more fully understood from the detailed description given below and from the accompanying drawings of the preferred embodiment of the invention, which however, should not be taken to limit the invention to the specific embodiments enumerated, but are for explanation and for better understanding only. Furthermore, the drawings are not necessarily to scale, emphasis instead being placed upon clearly illustrating the principles of the invention. Finally, like reference numerals in the figures designate corresponding parts throughout the several drawings.

DETAILED DESCRIPTION OF THE PREFERRED EMBODIMENT

Figure 1:
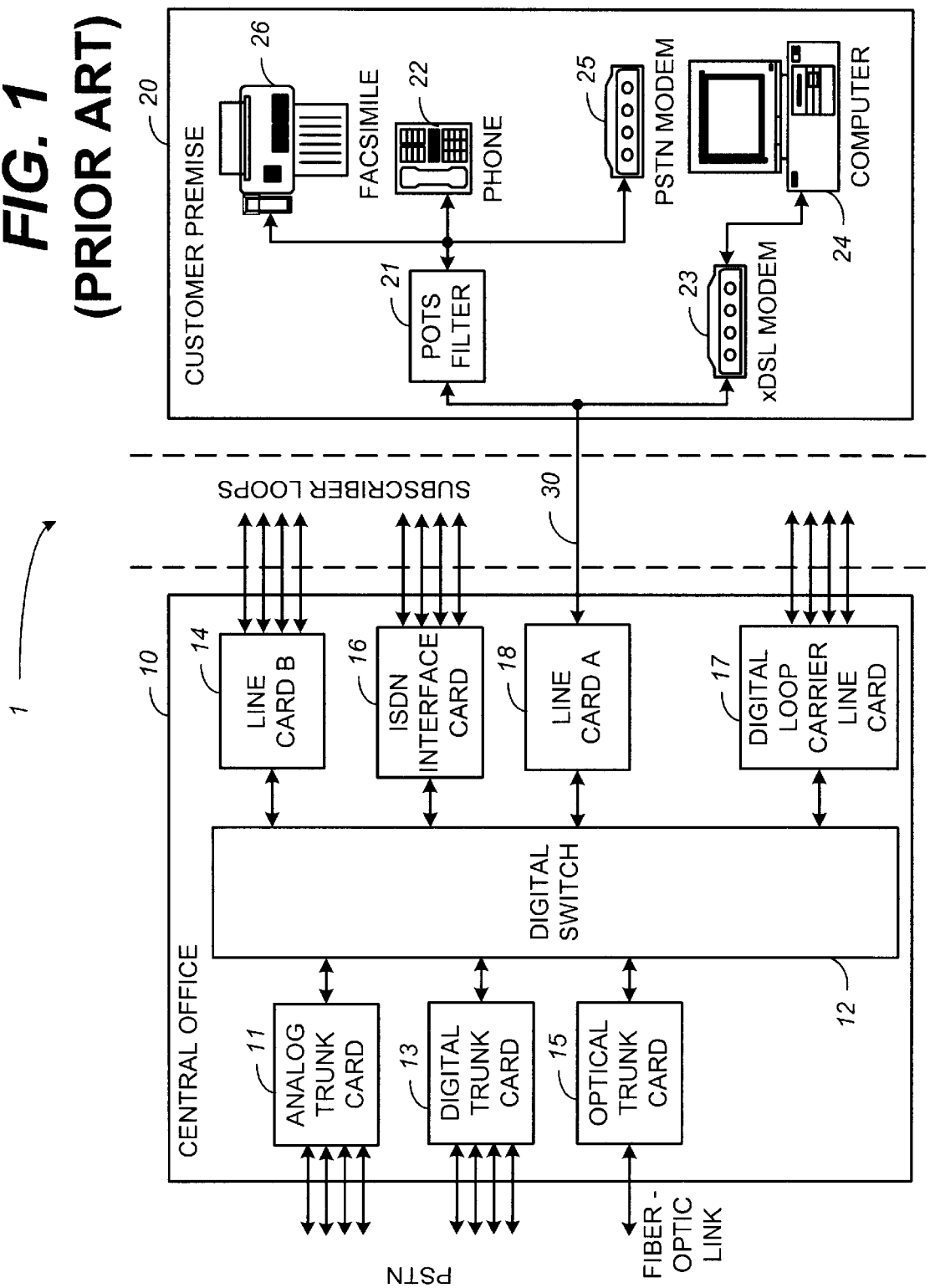
FIG. 1 is a prior art block diagram illustrating a xDSL communications system between a central office (CO) and a customer premise (CP).
Figure 2:
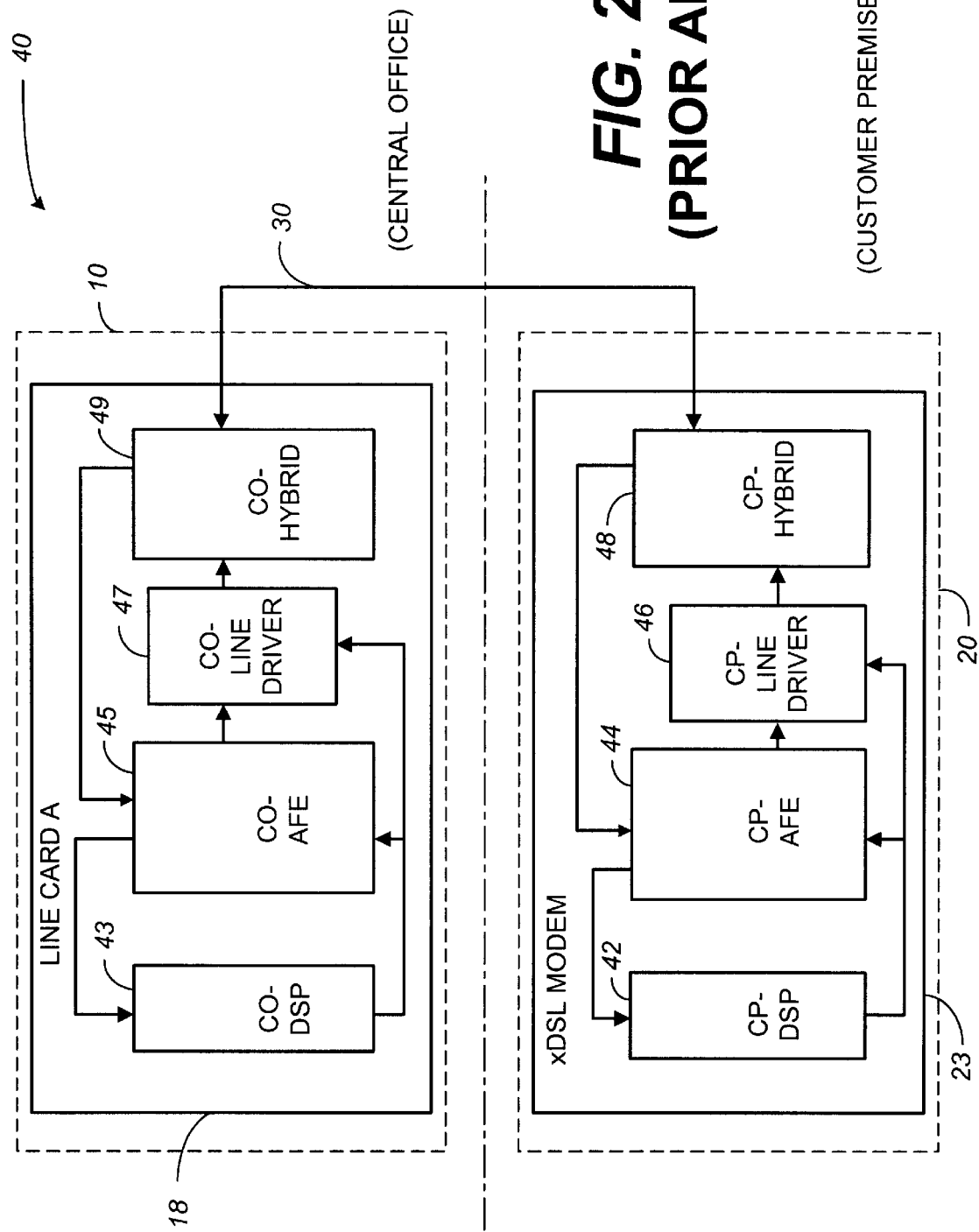
FIG. 2 is a prior art functional block diagram illustrating a xDSL communication link used in the xDSL communication system of FIG. 1 between a line card and a xDSL modem.

It is significant to note that the description presented herein will focus on the line driver 47 and the hybrid 49 (FIG. 2) located within the line card A 18 at the CO 10 within a xDSL communication system 1 (FIG. 1). This explanation and description are by way of example only. Those skilled in the art will appreciate that the concepts and teachings of the present invention may be applied to various line drivers as may be applied in a plethora of systems.

Figure 3:
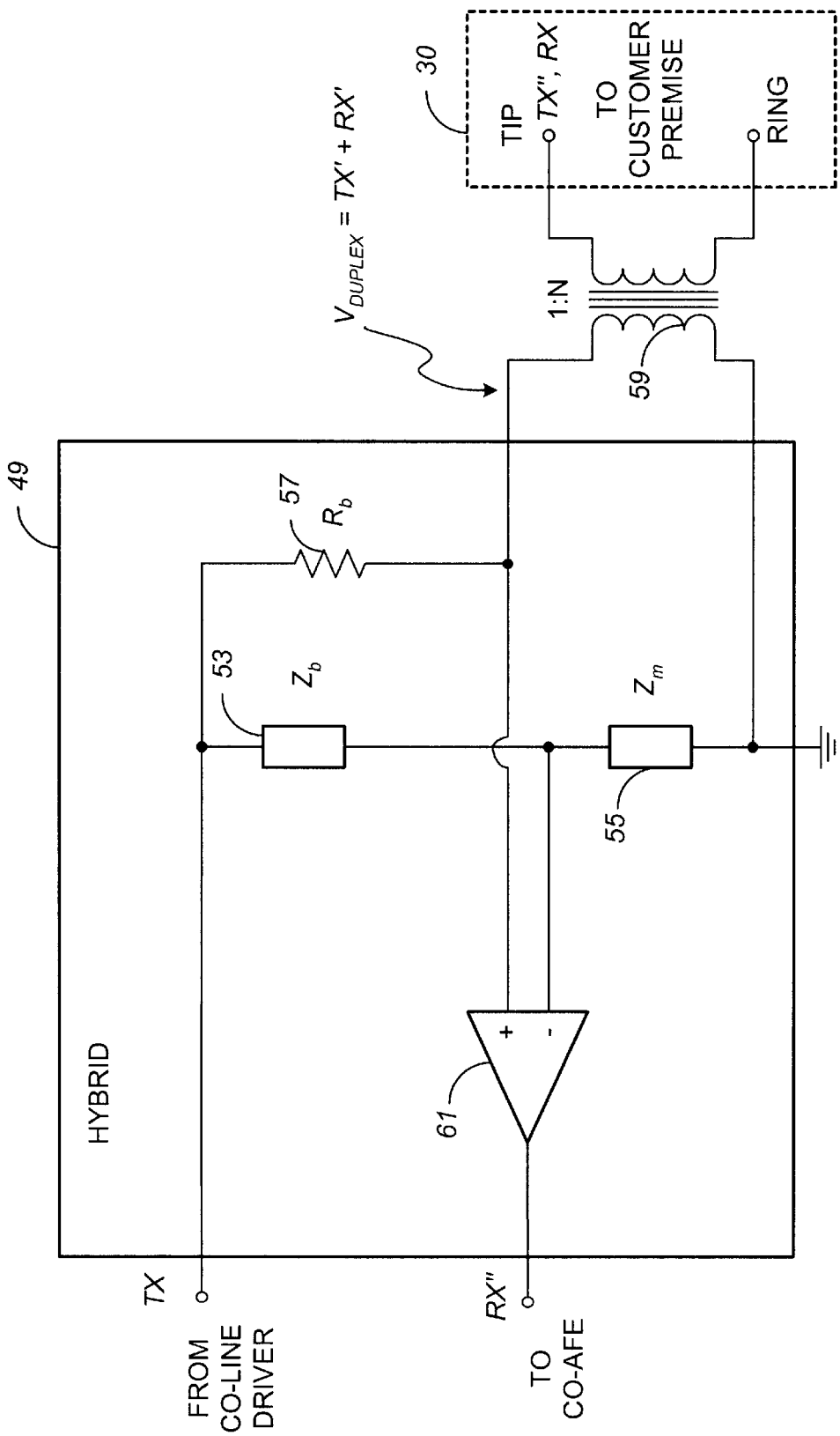
FIG. 3 is a prior art circuit schematic of a conventional hybrid that may be used to implement the xDSL communication link of FIG. 2.
Figure 5:
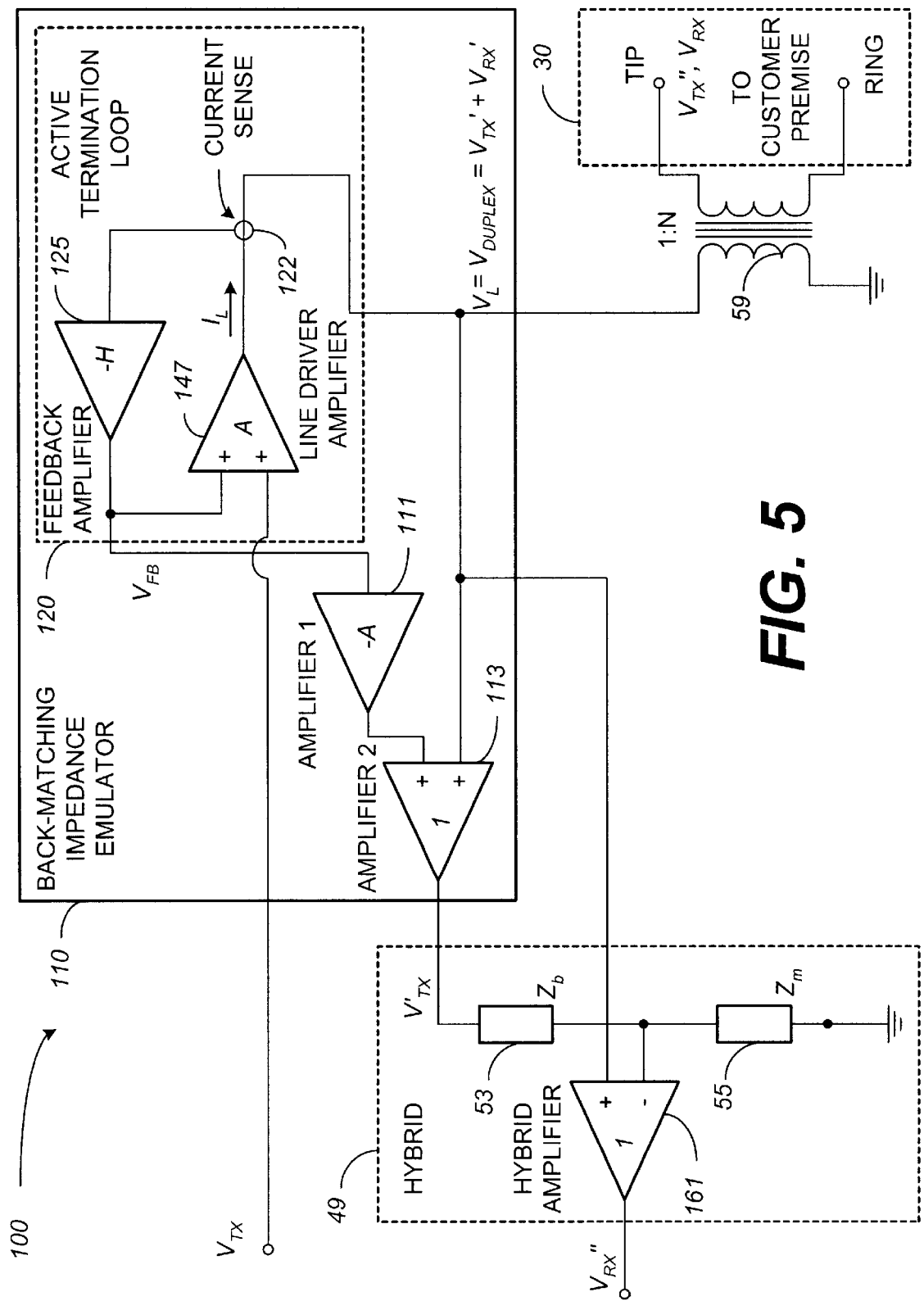
FIG. 5 is a circuit schematic of an improved combination line driver—hybrid in accordance with the present invention.

Turning now to the drawings illustrating the present invention, wherein like reference numerals designate corresponding parts throughout the drawings, FIG. 5 illustrates a circuit schematic of an improved combination line driver—hybrid circuit 100 in accordance with the present invention. As illustrated in FIG. 5, the improved combination line driver—hybrid 100 may comprise a back-matching impedance emulator 110 interposed generally in the position of the back-matching resistor 57 of the hybrid circuit of FIG. 3. The back-matching impedance emulator 110 may comprise an active termination loop 120, a first amplifier 111, labeled, "Amplifier 1," and a second amplifier 113, labeled, "Amplifier 2." As shown in FIG. 5, the back-matching impedance emulator 110 may receive a transmit signal input, $V_{TX}$, at a transmit signal input port. The transmit signal, $V_{TX}$, may be applied at an input of a line driver amplifier 147 having a transmit gain of A and configured to form a portion of the active termination loop 120. As is further illustrated in FIG. 5, the line driver amplifier 147 may be configured to source a load current, $I_L$, that may be applied through a current sensing means 122. The active termination loop 120 may be configured to apply the sensed current at the input of a feedback amplifier 125 having a gain of –H. It is significant to note that the feedback amplifier 125 gain may be expressed as the transfer function formed by the relationship between the output current and the output voltage from the feedback amplifier 125 which in operation has the dimension of resistance.

As illustrated in FIG. 5, the output of the line driver amplifier 147 may serve as a first output of the active termination loop 120 and may be electrically coupled to a first output of the back-matching impedance emulator 110. The amplified and current sensed transmit signal, $V_{TX}'$, may then be applied at the primary winding of the transformer 59 or at any other suitable isolation device capable of coupling the amplified transmit signal on the transmission line 30.

It will be appreciated that the amplified and current sensed transmit signal, $V_{TX}'$, may be inductively coupled from the primary winding of the transformer 59 to the secondary winding of the transformer 59, where in accordance with the turns ratio of 1:N a scaled version of the amplified and current sensed transmit signal, $V_{TX}''$, may be electrically coupled to a subscriber loop. It will be further appreciated that a remotely generated receive signal, $V_{RX}$, may also be applied at the secondary of the transformer 59. The receive signal, $V_{RX}$, may be inductively coupled from the secondary winding of the transformer 59 to the primary winding of the transformer 59, where in accordance with the turns ratio of 1:N a scaled version of the receive signal, $V_{RX}'$, may be electrically coupled to the back-matching impedance emulator 110.

As is also illustrated in FIG. 5, the output of the feedback amplifier 125 may be applied at a second output of the line driver amplifier 147, completing the active termination loop 120, as well as, at the input to the first amplifier 111, thus providing a second output from the active termination loop 120. It is significant to note that the first amplifier 111, coupled to the second output of the active termination loop 120, may be configured such that it has an equivalent transmit gain of –A. As further illustrated in the circuit of FIG. 5, the output of the first amplifier may be applied at a first input of a second amplifier 113. A second input to the second amplifier 113 may be coupled to the primary winding of the transformer 59 such that both the amplified transmit signal, $V_{TX}'$, and a remotely generated receive signal, $V_{RX}'$, may be present at node $V_L$. The output of the second amplifier 113 may form a second output of the back-matching impedance emulator 110 which may provide a scaled (e.g., amplified) version, $V'_{TX}$, of the transmit signal, $V_{TX}'$. The scaled version of the transmit signal, $V'_{TX}$, may be applied to a divider formed by the series combination of a first filter 53 and a second filter 55 as previously described with relation to the hybrid circuit of FIG. 3. A node interposed between the series combination formed by the first and second filters 53, 55 may be applied to a negative input terminal of a hybrid amplifier 161 as previously illustrated and described with relation to the hybrid of FIG. 3. As is also illustrated in the circuit of FIG. 5, a positive input terminal of the hybrid amplifier 161 may be coupled to the primary winding of the transformer 59.

Having described the architecture of the composite line driver—hybrid circuit 100 of FIG. 5 hereinabove, the following discussion will focus on circuit 100 operation in order to highlight the various functional aspects. In this regard, the composite line driver—hybrid circuit 100 functions as follows. The line driver amplifier 147 receives a signal to be transmitted, $V_{TX}$, and may be configured to amplify the transmit signal in accordance with a desired transmit signal power. The amplified transmit signal, $V_{TX}'$, may then be passed through a current sensing means 122 capable of sensing the load current, $I_L$, sourced by the line driver amplifier 147. The current sensing function may be implemented by any convenient means, for example a resistor having a small resistance value. The passage of amplified transmit signal, $V_{TX}'$, through the current sensing means 122 (e.g., the small resistor) will generate a corresponding small voltage in accordance with the well known relationship, V=I×R. where V is the voltage generated in Volts, I is the load current in Amperes sourced by the line driver amplifier 147, and R is the resistance value in Ohms of the small resistor. With suitable amplification, as may be provided by the feedback amplifier 125, the equivalent of a current sensing resistor with a current-to-voltage conversion ratio of –H can be implemented. In other words, the sensed value of the load current, $I_L$, may be multiplied by a factor of –H (which has the dimension of resistance) by the feedback amplifier 125 in order to generate an output voltage, herein labeled, "VFB." Assuming both the line driver amplifier 147 and the feedback amplifier 125 of the active termination loop 120 have high input impedances, the output of the feedback amplifier 125 can be described as follows:

$$V_{FB} = -H \times I_L. \qquad \text{Eq. 3}$$

As a result of the active termination loop 120, the load voltage at the primary winding of the transformer 59 can be determined by the following relationship:

$$V_L = A \times (V_{TX} + V_{FB}), \qquad \text{Eq. 4}$$

or in simpler terms, $V_L = AV_{TX} - AHI_L$. Thus the voltage, $V_L$, applied at the primary winding of the transformer 59 and the current through the winding, $I_L$, are related in a way which corresponds to a voltage controlled voltage source having a gain, A, in series with an impedance having an equivalent resistance of A×H Ohms. As a result, the active termination loop 120 functions as the equivalent of a line driver 47 (FIG. 2) with a transmit gain of A and a back-matching resistor 57 (FIG. 3) of A×H Ohms.

It is significant to note that the active termination loop 120 circuit configuration is that of a negative feedback circuit, where, assuming ideal components, any positive values may be used for both A and H, and the gain can be increased without loss of stability or a change in the sign of the output voltage. In other words, the equivalent line driver gain, A, and the back-matching impedance, A×H, may vary in magnitude but not in their sign (i.e., A and A×H will never go negative).

In order for a hybrid circuit to provide full duplex signal transmission (i.e., simultaneously transmit and receive separate and distinct signals on a transmission line 30), a voltage which comprises only the amplified transmit signal is required. Note that the output of the line driver amplifier 147 will have a component originating with a remotely generated receive signal, $V_{RX}$. To generate a voltage which is solely reflective of the transmit signal, the composite line driver—hybrid circuit 100 takes the voltage present on the primary winding of the transformer 59, $V_L$, and a voltage, $V_{FB}$, scaled by the gain of the first amplifier 111 to derive $V'_{TX}$ as shown by the following relationship:

$$V'_{TX}=V_L-A\times V_{FB}=V_L+AHI_L=AV_{TX}, \quad \text{Eq. 5}$$

which indicates that $V'_{TX}$ is the transmit signal, $V_{TX}$, multiplied (scaled) by the line driver amplifier 147 transmit gain. As further illustrated in FIG. 5 and in accordance with the hybrid circuit of FIG. 3, $V'_{TX}$ can be used by the hybrid filters 53, 55 ($Z_B$ and $Z_M$) to recover the remotely generated receive signal at node $V_{RX}''$. It is significant to note that the composite line driver—hybrid circuit 100 architecture illustrated in FIG. 5, permits the hybrid circuit components to remove line driver amplifier 147 noise and distortion.

It is of further significance to note that the combined line driver—hybrid circuit 100 of FIG. 5 was presented by way of example only. In alternative implementations, the various amplifiers may be merged together and equivalent signal gains could be obtained by appropriate signal scaling techniques well known and appreciated by those skilled in the art. The relative signal strength to and through the hybrid amplifier 161, however, must remain as described above in order to properly recover a remotely generated receive signal free of the effects of a local line driver amplifier responsible for generating a transmit signal in a duplex data transmission scheme.

Figure 4:
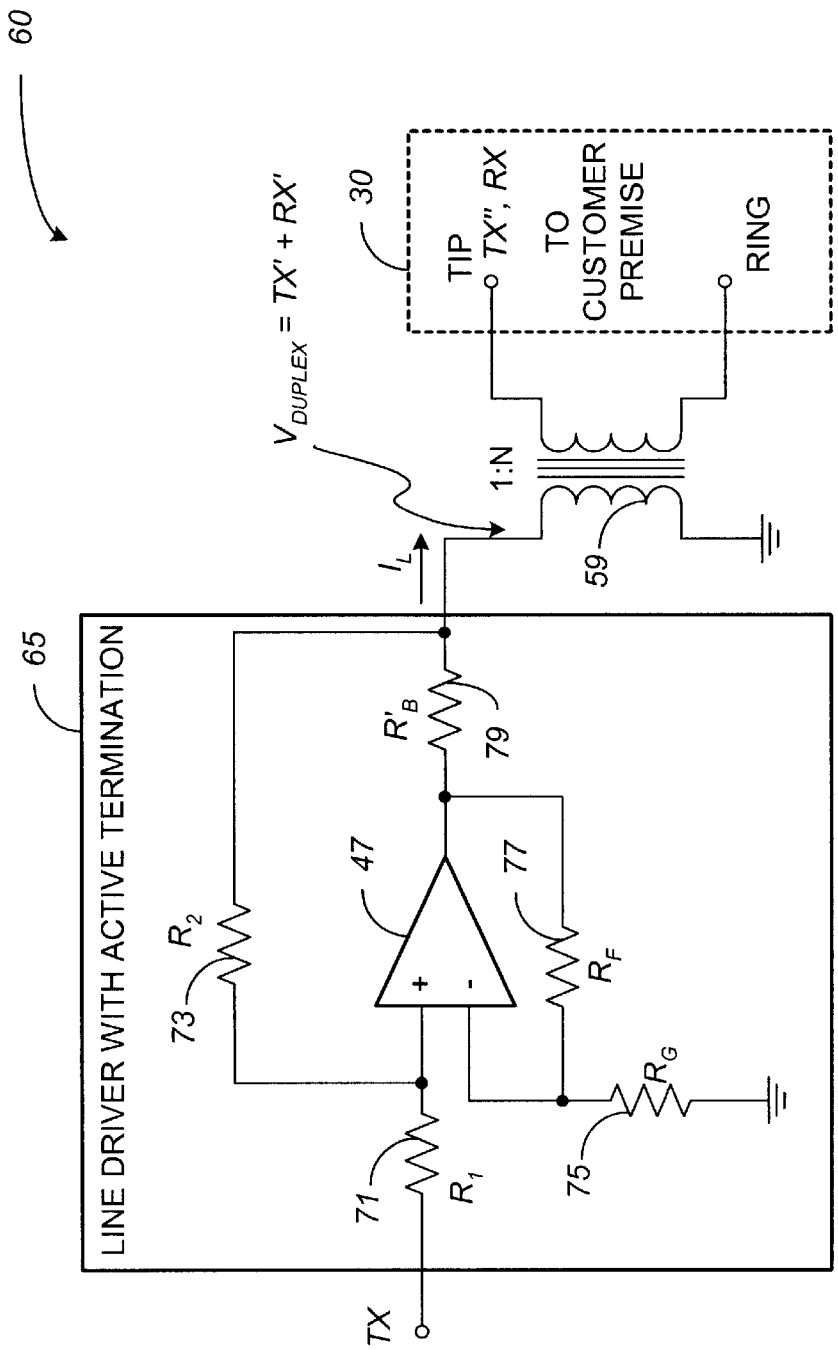
FIG. 4 is a prior art circuit schematic of a line driver having active termination as may be applied to the line driver of FIG. 2.

It is also significant to note that the active termination loop 120 of the back-matching impedance emulator 110 is quite different from the prior art positive feedback resistive network of FIG. 4. First, the feedback voltage, $V_{FB}$, a quantity proportional to the load current, $I_L$, is made available. Second, the feedback circuit is inherently stable in that the sign of the gain and the transfer function of the feedback amplifier can never change. Furthermore, an output signal, $V'_{TX}$, suitable for driving a hybrid is readily available. Last, by varying H or its equivalent, only the effective output impedance is changed not the equivalent transmit gain, A, of the line driver amplifier 147. As a result, H can be adjusted in order to compensate for scaling errors introduced by the current sensing means 122. In this way, the composite line driver—hybrid circuit 100 of FIG. 5, provides full duplex operation while removing many of the difficulties of the simple active termination of FIG. 4.

Figure 6:
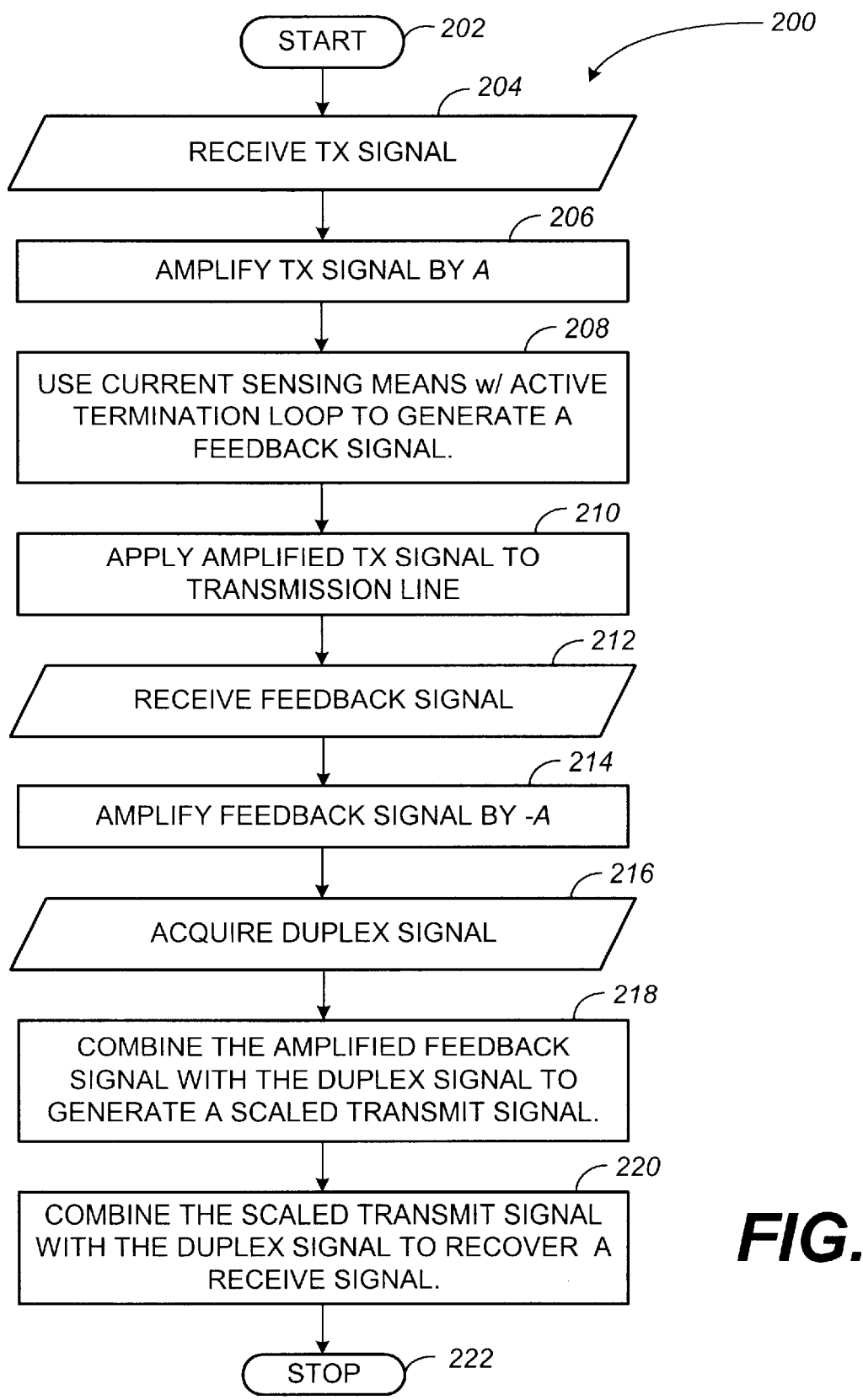
FIG. 6 is a flowchart highlighting a method of performing active termination that may be used by the circuit of FIG. 5 to provide a power efficient solution for systems designed to output a signal on a metallic transmission line.

Having introduced and described an exemplary embodiment of an improved line driver—hybrid circuit 100 in accordance with the present invention with regard to FIG. 5, reference is now directed to FIG. 6. In this regard, FIG. 6 illustrates a flowchart highlighting a method for performing active termination that may be used by the circuit of FIG. 5 to provide a power efficient solution for systems designed to output a signal on a metallic transmission line. In this regard the method for performing active termination 200 begins with step 202 herein designated as "start." The method for performing active termination 200 may be configured to receive a previously generated transmit signal as indicated in step 204. Once the transmit signal is available, the composite line driver-hybrid circuit 100 of FIG. 5, or another suitable circuit or system, may amplify the transmit signal as illustrated in step 206. As further illustrated in step 208 of FIG. 6, the method for performing active termination 200 may proceed by using a current sensing means in cooperation with a suitably configured circuit having a negative transfer function to create a feedback signal. The amplified transmit signal may be applied to the transmission line as shown in step 210.

The method for performing active termination 200 may continue with step 212 where the feedback signal is received. Having generated and received the feedback signal, the method for performing active termination 200 may proceed by amplifying the feedback signal with the inverse gain of the line driver amplifier 147 (FIG. 5) (i.e., multiply the feedback signal with –A as illustrated in step 214. Next, the method for performing active termination 200, may acquire a duplex signal transmission from a transmission line as indicated in step 216. Having adjusted the feedback signal and acquired the duplex signal transmission as described above, a scaled version of the transmit signal may be generated through a mathematical combination of the signals as illustrated in step 218. The method for active termination 200 may then proceed to recover a remotely generated receive signal by performing a mathematical combination of the scaled transmit signal and the acquired duplex signal as illustrated in step 220. Those skilled in the art will appreciate that steps 204 through 220 may be repeated as desired in order to perform actively terminate a transmission line in a duplex transmission system. Any suitable method for aborting and or ending the method herein described may be used as illustrated in step 222, labeled, "stop."

It is significant to note that the sequence presented in FIG. 6 is by way of example only. Those skilled in the art will appreciate that particular steps may in fact be performed out of sequence or substantially simultaneously. For example, once the transmit signal is received and amplified it may be applied to the transmission line at any time prior to acquiring the duplex signal transmission from the transmission line. As a result step 210 may be performed as early or substantially simultaneously across a range of steps generally defined from after step 206 to before step 216.

In the preferred embodiment of the present invention, which is intended to be a non-limiting example, each of the functions herein introduced and described may be implemented through a combination of an improved line driver 47 with a hybrid 49 in a circuit configuration. Furthermore, the method for performing active termination 200 as illustrated in FIG. 6 may comprise a set of processing steps that may be implemented in software and executed by a computing device in communication or integrated within the aforementioned devices. For example, each of the aforementioned devices may be in communication with but not limited to, a personal computer, a workstation, minicomputer, a controller, or a mainframe computer. The software based system, which comprises an ordered list of executable instructions for implementing logical functions, can be embodied in any computer readable medium for use by, or in connection with, an instruction execution system, apparatus, or device such as a computer based system, processor containing system, or other systems that can fetch the instructions from the instruction execution system, apparatus, or device and execute the instructions. In the context of this document, a "computer readable medium" can be any means that can contain, store, communicate, propagate or transport the program for use by or in connection with the instruction execution system, apparatus or device. The computer readable medium can be, for example, but not limited to, an electronic, magnetic, optical, electromagnetic, infrared or semiconductor system, apparatus, device, or propagation medium. More specific examples (a non-exhaustive list) of the computer readable medium would include the following: an electrical connection (electronic) having one or more wires, a portable computer diskette (magnetic), a random access memory (RAM) (magnetic), a read only memory (ROM) (magnetic), an erasable program read only memory (EPROM or flash memory) (magnetic), an optical fiber (optical), and a portable compact disk read only memory (CDROM) (optical). Note that the computer readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

What is claimed is:

1. A line driver with back-matching impedance emulation having a transmission line termination control loop, comprising:

a power amplifier having a power amplifier transmit gain configured with a first input for receiving a transmit signal, a second input for receiving an amplified feedback signal, and an output configured to provide an amplified transmit signal to the transmission line;

a current sensing means electrically coupled to the power amplifier output and configured to generate a feedback input signal;

a feedback amplifier having a negative transresistance forward transfer function configured to receive the feedback input signal and provide an amplified feedback signal to the second input of the power amplifier;

a first amplifier configured to receive the amplified feedback signal and apply a first amplifier transmit gain equivalent to the inverse of the power amplifier transmit gain to provide a first amplifier output signal; and a second amplifier configured to receive a first input comprising at least one signal from the transmission line and a second input comprising the first amplifier output signal, the second amplifier configured to mathematically combine the input signals to generate a scaled version of the transmit signal.

2. The line driver of claim 1, wherein the current sensing means comprises a resistor coupled in series with the amplified transmit signal.

3. The line driver of claim 1, wherein from the perspective of the transmission line, the transmission line termination control loop is the equivalent of an amplifier in series with an emulated back-matching resistor.

4. The line driver of claim 3, wherein the power amplifier transmit gain and the back-matching resistor have values that maintain a constant sign.

5. The line driver of claim 1, wherein the amplified transmit signal is suitable for driving a hybrid circuit.

6. The line driver of claim 3, wherein the emulated back-matching resistor has an equivalent resistance value less than the transmission line impedance.

7. The line driver of claim 3, wherein the resistance of the emulated back-matching resistor is a function of the transmit gain of both the power amplifier and the feedback amplifier.

8. The line driver of claim 7, wherein the transmit gain of the feedback amplifier is controllably adjusted to modify an output impedance as seen by a transmission line.

9. The line driver of claim 7, wherein the transmit gain of the feedback amplifier is controllably adjusted in response to scaling errors generated by the current sensing means.

10. The line driver of claim 1, wherein the scaled version of the transmit signal is applied at a voltage divider comprising a first filter configured to emulate the back-matching resistance and a second filter configured to emulate the transmission line impedance, wherein the first input of a hybrid amplifier is configured to receive the voltage at a node disposed between the first and second filters and wherein the at least one signal from the transmission line is applied at a second input of the hybrid amplifier, the hybrid amplifier configured to mathematically combine the scaled version of the transmit signal with the at least one signal from the transmission line to recover a receive signal.

11. The line driver of claim 10, wherein the scaled version of the transmit signal is subtracted by the hybrid amplifier in order to recover the receive signal.

12. The line driver of claim 10, wherein the scaled version of the transmit signal comprises transmit signal imperfections.

13. The line driver of claim 12, wherein the transmit signal imperfections comprise noise and distortion introduced by the power amplifier.

14. An improved line driver having an output load current, comprising:

means for amplifying a transmit signal; and means for emulating a back-matching resistance using a negative feedback circuit configuration wherein the means for emulating a back-matching resistance is accomplished by amplifying a feedback signal responsive to the output load current such that the emulated back-matching resistance appears to have a resistance value equivalent to the product of the transmit signal amplification gain and the feedback signal amplification gain.

15. The line driver of claim 14, wherein the output load current sensing means comprises a resistor.

16. A signal transmission unit having a transmit signal amplification gain, comprising: a line driver in cooperation with a negative feedback transmission line termination control loop having a feedback signal amplification gain that emulates a back-matching resistor having a resistance value equivalent to the product of the transmit signal amplification gain and the feedback signal amplification gain.

17. A communications system having a transmit signal amplification gain, comprising: a transmission unit having a line driver, the line driver having a negative feedback transmission line termination control loop having a feedback signal amplification gain that emulates a back-matching resistor having a resistance value equivalent to the product of the transmit signal amplification gain and the feedback signal amplification gain.

18. A method for increasing the power efficiency, signal accuracy, and stability of a transmit signal on a transmission line, comprising:

applying a transmit signal to an input of a line driver;

amplifying the transmit signal;

applying the amplified transmit signal to a transmission line load to generate a load current;

sensing the load current;

applying the sensed load current in a negative feedback transmission line termination control loop having a feedback amplifier to generate an amplified feedback signal responsive to the load current such that an output impedance emulates a back-matching resistor wherein the transmit gain of the feedback amplifier is controllably adjusted in response to scaling errors associated with the sensed load current.

19. The method of claim 18, wherein the load current is sensed with a resistor having a resistance value less than the expected transmission line load impedance.

20. The method of claim 18, wherein the impedance of the emulated back-matching resistor is a function of the transmit gain of both a line driver power amplifier and a feedback amplifier.

21. The method of claim 20, wherein the transmit gain of the feedback amplifier is controllably adjusted to modify the output impedance as seen by a transmission line.

22. A method for recovering a remotely generated signal from a transmission line in a duplex communication system, comprising:

applying a transmit signal to an input stage of a line driver;

amplifying the transmit signal with a line driver amplifier;

using an active termination feedback control loop in cooperation with the line driver amplifier to generate a feedback signal responsive to a load current;

applying the amplified transmit signal on the transmission line;

amplifying the feedback signal to generate a line driver output impedance that emulates a back-matching resistor;

further amplifying the feedback signal with an inverted transmit gain substantially equivalent in magnitude with the gain of the line driver amplifier;

combining the further amplified feedback signal with a duplex signal on the transmission line to generate a scaled transmit signal; and combining the scaled transmit signal with the duplex signal to recover a remotely generated receive signal from the transmission line.

23. The method of claim 22, wherein the active termination feedback control loop senses the load current with a resistor having a resistance value less than the transmission line load impedance.

24. The method of claim 23, wherein the impedance of the emulated back-matching resistor is a function of the transmit gain of both the line driver power amplifier and a feedback amplifier.

25. The method of claim 24, wherein the transmit gain of the feedback amplifier is controllably adjusted to modify the output impedance as seen by the transmission line.

26. The method of claim 24, wherein the transmit gain of the feedback amplifier is controllably adjusted in response to scaling errors associated with the sensed load current.

\* \* \* \* \*

UNITED STATES PATENT AND TRADEMARK OFFICE
CERTIFICATE OF CORRECTION

PATENT NO. : 6,788,745 B1  
DATED : September 7, 2004  
INVENTOR(S) : Lim and Muralt Page 1 of 1

It is certified that error appears in the above-identified patent and that said Letters Patent is hereby corrected as shown below:

Title page,
Item [73], Assignee, delete "Fujitsu Limited, kawasaki (JP)" and replace with
-- GlobespanVirata, Inc, Red Bank, New Jersey --.

Signed and Sealed this

Twenty-first Day of December, 2004

JON W. DUDAS
*Director of the United States Patent and Trademark Office*